United States Patent

Sadiq et al.

[11] Patent Number: 5,978,581
[45] Date of Patent: Nov. 2, 1999

[54] OBJECT-ORIENTED CODE GENERATION SYSTEM AND METHOD

[75] Inventors: Waqar Sadiq, Rochester Hills; Fred Arthur Cummins, Farmington Hills, both of Mich.

[73] Assignee: Electronic Data Systems Corporation, Plano, Tex.

[21] Appl. No.: 08/982,331

[22] Filed: Dec. 2, 1997

[51] Int. Cl.$^6$ .................................................. G06F 9/45
[52] U.S. Cl. .......................................................... 395/702
[58] Field of Search .................................................. 395/702

[56] References Cited

U.S. PATENT DOCUMENTS

| | | | |
|---|---|---|---|
| 5,675,801 | 10/1997 | Lindsey | 395/702 |
| 5,699,310 | 12/1997 | Garloff et al. | 395/710 |
| 5,848,419 | 12/1998 | Hapner et al. | 703/103 |

*Primary Examiner*—Tariq R. Hafiz
*Assistant Examiner*—Wei Zhen
*Attorney, Agent, or Firm*—L. Joy Griebenow; Baker & Botts L.L.P.

[57] ABSTRACT

One aspect of the invention is a method of generating object-oriented code. An object model is captured for at least one object using a computer. Code interpretable by a compiler is then generated based upon the object model. The code comprises a base object class (46) and a custom object class (50) where the base object class (46) comprises a base object header file and base object implementation file while the custom object class (50) comprises a custom object header file and custom object implementation file. The base object class (46) inherits from a framework object class (44) while the custom object class (50) inherits from the base object class (46). In response to a change in the object model, a new base object header file, base object implementation file, and custom object header file are generated while preserving at least some code in the base object implementation file.

20 Claims, 2 Drawing Sheets

OBJECT-ORIENTED CODE GENERATION SYSTEM AND METHOD

TECHNICAL FIELD OF THE INVENTION

This invention relates generally to object-oriented programming and more particularly to a method and system for object-oriented code generation.

BACKGROUND OF THE INVENTION

Software reusability has been a much sought after goal. Rather than having to create software to perform similar operations in different projects, it would be desirable to allow the use of various pieces of a software application in other software applications. Object-oriented systems allow reuse of certain software components because interdependency among those components is reduced. Software objects may be created and tested as independent units. The ability to reuse software components allows programmers to deal with problems on a higher level of abstraction. Various environments and toolkits can be used to address lower level details.

Because software objects, if properly defined, can be easily shared by diverse software applications, software developers have created toolkits and environments to handle low-level details such as printing, interaction with an operating system, interaction with a computer network, display of information on a computer monitor, and communications with other systems using various types of communications links. Freed from these lower level details, developers of object-oriented systems may concentrate on the particular software features desired by the end-user of the software.

To facilitate reuse of software objects, an object framework will often include an object modeling tool to allow a user to specify instance variables and methods for various objects and the relationship between various objects. The object modeling tool captures a user's object model and often will interface with a code generation tool. Generated code will address the lower level details of services provided by the framework based upon the user's object model. After such code generation, the application developer will need to write the code for the methods unique to the developer's application.

When the application developer later changes the object model, however, existing code generators may have difficulty in handling such changes as the code generation process may end up overwriting the code that was previously written for the various application-specific methods. What is needed is a method to preserve the methods that have been developed by the application developer while allowing easy regeneration of code in response to changes in the application developer's object model or to changes in the framework itself.

SUMMARY OF THE INVENTION

One aspect of the invention is a method for generating object-oriented code. In accordance with the method, a computer is used to capture an object model. Based upon this object model, code interpretable by a compiler is generated wherein the code comprises a base object class and a custom object class. The base object class comprises a base object header file and base object implementation file while the custom object class comprises a custom object header file and custom object implementation file. The base object class inherits from a framework object class while the custom object class inherits from the base object class. In response to a change in the object model, a new base object header file, base object implementation file, and custom object header file are generated while at least some code is preserved in the base object implementation file.

The invention has several important technical advantages. It allows application developers to make significant changes to an object-oriented application without worrying about the lower level functionality of the application provided by a framework. Because the invention allows segregation of developer code from generated code used to implement services provided by the framework, application developers can easily manage such changes. In addition, as new versions of the framework are created, an application developer may easily adapt the existing applications to incorporate the new version of the framework by simply regenerating code based upon the application object model. The custom code developed by the application developer will not be affected by such changes.

The invention also allows creation of method shells that remind the application developer of those methods that need to be customized based upon the object definition. The automatic generation of method shells allows a compiler to remind the application developer when a method has not been defined or when a method has not been incorporated into the object model. In both instances, the invention avoids problems in the functionality of the compiled application.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

Figure 1:
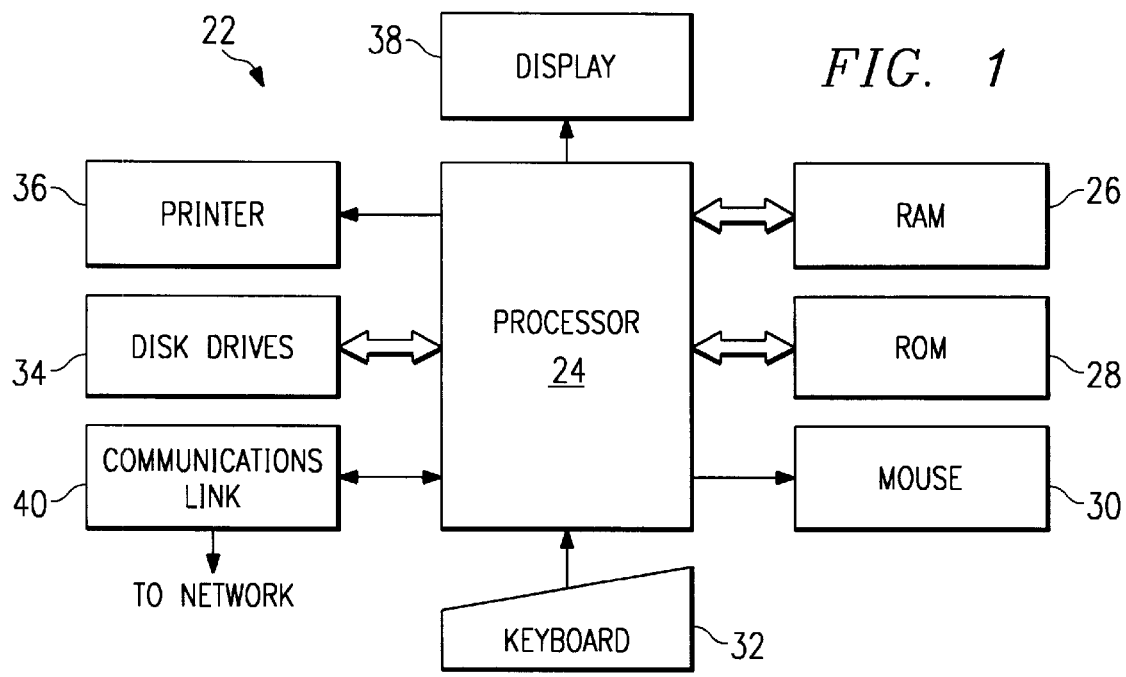
FIG. 1 illustrates a general purpose computer that may be used to implement the present invention.
Figure 2:
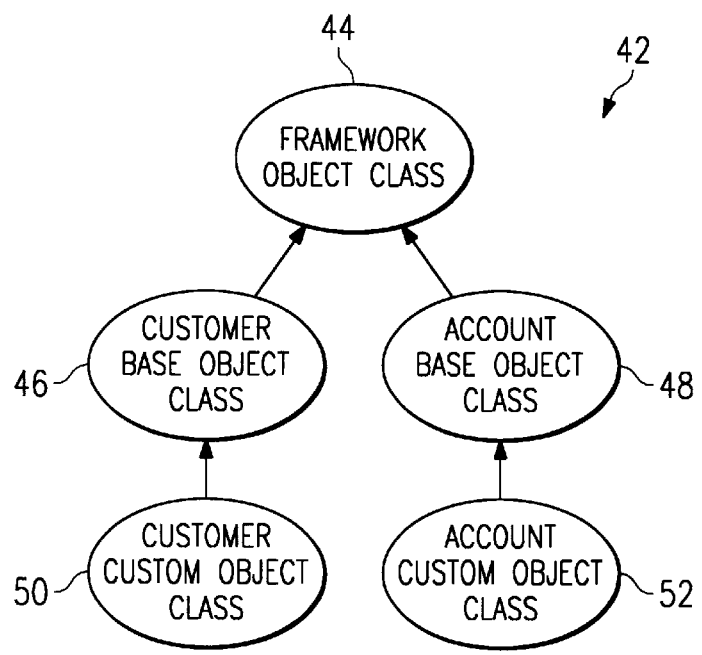
FIG. 2 illustrates a class diagram of an exemplary application created in accordance with the teachings of the invention.
Figure 3:
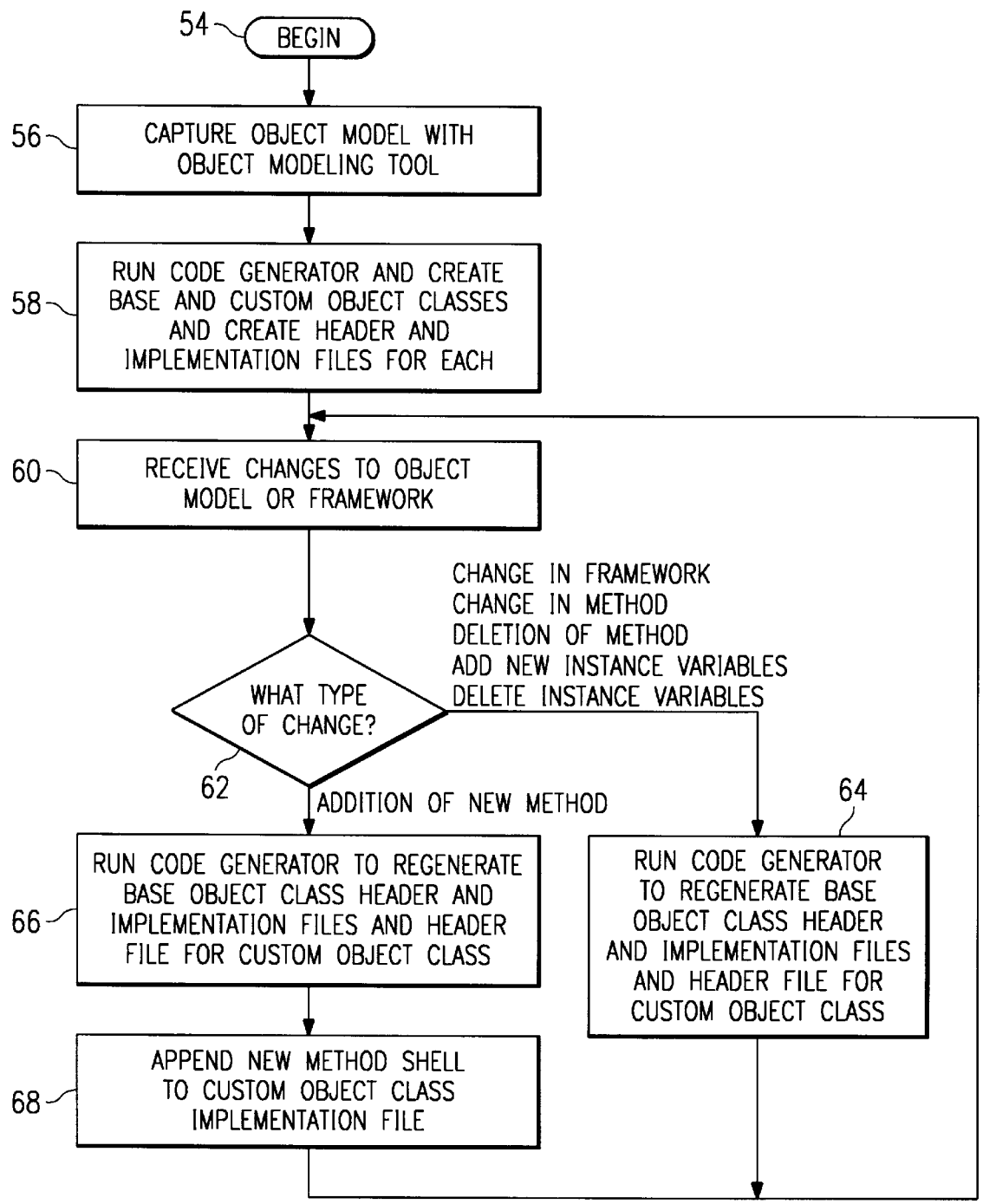
FIG. 3 illustrates a flowchart describing the operation of an exemplary embodiment of the invention.

The preferred embodiment of the present invention and its advantages are best understood by referring to FIGS. 1–3 of the drawings, like numerals being used for like and corresponding parts of the various drawings.

FIG. 1 illustrates a general purpose computer 22 that may be used to implement the present invention. General purpose computer 22 may be used to generate object-oriented code in accordance with the invention. General purpose computer 22 may be adapted to execute any of the well-known MS-DOS, PC-DOS, OS2, UNIX, MAC-OS and WINDOWS operating systems or other operating systems. General purpose computer 22 comprises processor 24, random access memory (RAM) 26, read-only memory (ROM) 28, mouse 30, keyboard 32 and input/output devices, such as disk drives 34, printer 36, display 38 and communications link 40. The present invention includes programs that may be stored in RAM 26, ROM 28, or disk drives 34 and may be executed by processor 24. Communications link 40 may be connected to a computer network such as may be used with a distributed object system. Communications link 40 could also be connected to a telephone line, an antenna, a gateway, or any other type of communications link. Disk drives 34 may include a variety of types of storage media such as, for example, floppy disk drives, hard disk drives, CD ROM drives, or magnetic tape drives. Although this embodiment employs a plurality of disk drives 34, a single disk drive 34 could be used without departing from the scope of the invention. FIG. 1 provides only one example of a computer that may be used with the invention. The invention could be used on computers other than general purpose computers, as well as on general purpose computers without conventional operating systems.

FIG. 2 illustrates an object class diagram of an exemplary application developed in accordance with the teachings of the invention. In this example, application 42 represents a simple application that may be used for a bank. Here, the application includes separate object classes for the bank's customers and for customer accounts. Application 42 is provided by way of example only and the invention could be used to generate any type of object-oriented application. Similarly, application 42 is designed to be used in a distributed object system. Although the invention is particularly useful for code generation in distributed object systems, it could be used for code generation in any object-oriented environment.

Application 42 comprises framework object class 44. In this embodiment, framework object class 44 comprises an object class for a distributed object system framework. In other words, framework object class 44 comprises instance variables and methods used to implement various services in a distributed object system. The term framework is used broadly to denote one or more object classes that together define an architecture for implementing particular functions. Example services that may be provided by framework object class 44 include life cycle services, persistence services, transaction management, concurrency control, relationship services, query services, workload management, and notification. Although framework object class 44 may be used for distributed object systems, the invention may be used with any type of framework.

Life cycle services allow the creation, deletion, movement, copying, activation, and deactivation of objects in a distributed object environment. Persistence services allow interaction with one or more databases in a distributed object environment to maintain persistence of those objects. Transaction management may employ a commit protocol to ensure that all work for a transaction either completes successfully or fails as a unit. Concurrency control may be used in a distributed object environment to be sure that transactions are serialized when multiple processes seek to modify a distributed object. The relationship service may be used to manage relationships between various distributed objects in a distributed object environment. The query service may be used to query a database to retrieve one or more objects in a distributed object environment. Workload management services may be used to ensure good overall system performance by balancing the processing workload among multiple computers in a distributed object system. Notification services may be used to allow objects in a distributed object system to request notification if some event occurs to another object.

In application 42, the application developer has specified two separate logical object classes—a customer object class and an account object class. These object classes would be defined by the application developer using an object modeling tool. Based upon these logical objects, a code generator constructed in accordance with the invention may then separate each logical object class into multiple actual object classes, each object class comprising a header file and an implementation file. The invention employs inheritance to accomplish such a division.

In this example, the logical customer object class is divided into two actual object classes—customer base object class 46 and customer custom object class 50. Similarly, the logical account object class is divided into two actual object classes—account base object class 48 and account custom object class 52. Each of the custom object classes 50, and 52 inherits from their respective base object class, 46 and 48. The base object classes 46 and 48 inherit from framework object class 44.

This inheritance relationship allows the functionality of the framework, a distributed object system framework in this example, to be summarized in one object class, in this case, framework object class 44. After an application developer defines an object model, a code generator generates base object classes and custom object classes corresponding to the objects defined by object model. Customer base object class 46 and account base object class 48 contain the code unique to their corresponding logical objects that is used to implement services provided by the framework. Thus, customer base object class 46 and account base object class 48 are created by a code generator and will ordinarily not be modified by the application developer.

The application developer will write the code for the various methods specified in the object model for the custom application. This code will be contained in customer custom object class 50 and account custom object class 52 in this example. These custom object classes 50 and 52 inherit from their respective base object classes 46 and 48, thus allowing a custom application to employ the services provided by the framework in a way that is transparent to the application developer.

The invention takes advantage of a feature of the programming language C++. In C++, separate files may be used for object class declaration and object class definition. An object class declaration file may also be referred to as a header file while an object class definition file may also be referred to as an implementation file. For each of the base object classes 46 and 48 and custom object classes 50 and 52, the invention employs a code generator to create a separate header and implementation file for each object class. The use of separate header and implementation files combined with the division of the logical object classes into multiple actual object classes allows the application developer to dynamically adjust the characteristics of an object-oriented application without significant difficulty. The method of generating code in accordance with the invention will now be described in connection with FIG. 3.

FIG. 3 is a flowchart illustrating a method of generating object-oriented code in accordance with the teachings of the invention. The process begins in step 54 with the initialization of computer software used to capture an object model and interact with a code generator. In step 56, an object model is captured with an object modeling tool. The application developer may use the object modeling tool to define object classes, including a list of their methods and instance variables. In addition, the application developer may specify relationships between object classes and, in this embodiment, a list of databases where instance variables related to the object will be stored along with various data about such storage in those databases. More or less information regarding an object model could be captured by an object modeling tool without departing from the scope of the invention.

Next, in step 58, the application developer indicates that the object model is complete and that code generation should begin. The application developer runs the code generator to create base and custom object classes for each logical object class defined using the object modeling tool. For C++, header and implementation files are also defined for each base object class and each custom object class, respectively.

Next, in step 60, changes are received either to the object model or to the framework supporting the application. When such changes are received, new code must be generated to account for such changes. In step 62, it is determined what type of change has been made. If the framework has been changed, a method has been changed or deleted, or instance variables have been added or deleted, then the code generator will act as described in step 64. If a new method has been added, then the code generator will act as described in steps 66 and 68. The flowchart in FIG. 3 has been simplified to demonstrate operation of the code generator in response to a single change to the object model or framework. If multiple changes are made, then the code generator will react as described for each individual change.

In step 64, the code generator is again run to regenerate the code for the custom developed application. The base object class header and implementation files are both regenerated at this time. The custom object class is handled differently, however, as only the header file for the custom object class is regenerated. The implementation file for the custom object class is not modified, thus preserving the code written by the application developer.

If a new method was added, then in step 66, the code generator regenerates the base object class header and implementation files as well as the header file for the custom object class. Then, in step 68, a new method shell is appended to the custom object class implementation file. The application developer may then insert the code for the new method in the new method shell in the custom object class implementation file.

When the generated code is compiled, the nature of the invention will allow errors to be easily deleted. For example, if the application developer deletes a method from the object model but forgets to delete the method from the object class implementation file, then the compiler will generate an error message because the deleted method will still appear in the object class implementation file but will be undefined. If the application developer adds a new method but forgets to write the code to insert into the shell for that new method, then the compiler will generate an error message for this method.

Although the present invention has been described in detail, it should be understood that various changes, substitutions, and alterations can be made hereto without departing from the spirit and scope of the invention as defined by the appended claims.

What is claimed is:

1. An object-oriented code generation system for use with a computer, comprising:
   an object modeling tool operable to run on the computer and operable to capture an object model for at least one object;
   a code generator operable to run on the computer and operable to generate code interpretable by a compiler based upon the object model, the code comprising a base object class and a custom object class, the base object class comprising a base object header file and base object implementation file, the custom object class comprising a custom object header file and custom object implementation file;
   wherein the base object class inherits from a framework object class;
   wherein the custom object class inherits from the base object class; and
   wherein the code generator is further operable, in response to a change in the object model, to generate a new base object header file, base object implementation file, and custom object header file, while preserving at least some code in the custom object implementation file.

2. The object-oriented code generation system of claim 1, wherein the code generator is further operable, in response to a change in the object model wherein a new method is added to the object model, to append a shell of the new method to the custom object implementation file.

3. The object-oriented code generation system of claim 1, wherein the compiler comprises a C++ compiler.

4. The object-oriented code generation system of claim 1, wherein the base object class comprises methods operable to be used internally by a framework.

5. The object-oriented code generation system of claim 4, wherein the framework comprises services used to implement a distributed object system.

6. The object-oriented code generation system of claim 5, wherein the code generator is further operable, in response to a change in the object model wherein a new method is added to the object model, to append a shell of the new method to the custom object implementation file.

7. The object-oriented code generation system of claim 4, wherein the framework is capable of providing, in a distributed object system, at least one service selected from the group of lifecycle service, persistence service, transaction management, concurrence control, relationship service, query service, workload management, and notification service.

8. An object-oriented code generation system, comprising:
   a computer readable medium;
   an object modeling tool stored on the computer readable medium and operable to capture an object model for at least one object;
   a code generator stored on the computer readable medium and operable to generate code interpretable by a compiler based upon the object model, the code comprising a base object class and a custom object class, the base object class comprising a base object header file and base object implementation file, the custom object class comprising a custom object header file and custom object implementation file;
   wherein the base object class inherits from a framework object class;
   wherein the custom object class inherits from the base object class; and
   wherein the code generator is further operable, in response to a change in the object model, to generate a new base object header file, base object implementation file, and custom object header file, while preserving at least some code in the custom object implementation file.

9. The object-oriented code generation system of claim 8, wherein the code generator is further operable, in response to a change in the object model wherein a new method is added to the object model, to append a shell of the new method to the custom object implementation file.

10. The object-oriented code generation system of claim 8, wherein the compiler comprises a C++ compiler.

11. The object-oriented code generation system of claim 8, wherein the base object class comprises methods operable to be used internally by a framework.

12. The object-oriented code generation system of claim 11, wherein the framework comprises services used to implement a distributed object system.

13. The object-oriented code generation system of claim 11, wherein the framework is capable of providing, in a distributed object system, at least one service selected from the group of lifecycle service, persistence service, transaction management, concurrence control, relationship service, query service, workload management, and notification service.

14. The object-oriented code generation system of claim 13, wherein the code generator is further operable, in response to a change in the object model wherein a new method is added to the object model, to append a shell of the new method to the custom object implementation file.

15. A method of generating object-oriented code, comprising:

capturing an object model for at least one object using a computer;

generating code interpretable by a compiler based upon the object model, the code comprising a base object class and a custom object class, the base object class comprising a base object header file and base object implementation file, the custom object class comprising a custom object header file and custom object implementation file;

wherein the base object class inherits from a framework object class;

wherein the custom object class inherits from the base object class; and generating, in response to a change in the object model, a new base object header file, base object implementation file, and custom object header file, while preserving at least some code in the custom object implementation file.

16. The method of claim 15, further comprising:

appending a shell of the new method to the custom object implementation file in response to the addition of a new method to the object model.

17. The method of claim 15, wherein the compiler comprises a C++ compiler.

18. The method of claim 15, wherein the base object class comprises methods operable to be used internally by a framework.

19. The method of claim 18, wherein the framework comprises services used to implement a distributed object system.

20. The method of claim 19, wherein the framework is capable of providing, in a distributed object system, at least one service selected from the group of lifecycle service, persistence service, transaction management, concurrence control, relationship service, query service, workload management, and notification service.

* * * * *